United States Patent
Achard et al.

(10) Patent No.: US 8,940,176 B2
(45) Date of Patent: Jan. 27, 2015

(54) METHOD AND A DEVICE FOR EXTRACTING A LIQUID PHASE FROM A SUSPENSION

(75) Inventors: Jean Luc Achard, Grenoble (FR); Elodie Sollier, Grenoble (FR); Hervé Rostaing, Le Versoud (FR)

(73) Assignee: Commissariat a l'Energie Atomique Centre National de la Recherche Scientifique, Paris (FR)

( * ) Notice: Subject to any disclaimer, the term of this patent is extended or adjusted under 35 U.S.C. 154(b) by 89 days.

(21) Appl. No.: 12/465,133

(22) Filed: May 13, 2009

(65) Prior Publication Data

US 2009/0283483 A1   Nov. 19, 2009

(30) Foreign Application Priority Data

May 13, 2008   (FR) ...................................... 08 02576

(51) Int. Cl.
  *B01D 21/28* (2006.01)
  *B01D 63/00* (2006.01)
  *B01D 21/00* (2006.01)
  *B01D 21/26* (2006.01)
  *B01L 3/00* (2006.01)

(52) U.S. Cl.
  CPC .......... *B01D 21/0012* (2013.01); *B01D 21/265* (2013.01); *B01L 3/502753* (2013.01); *B01D 2221/10* (2013.01)
  USPC ........... 210/802; 210/801; 210/804; 210/252; 210/519; 210/321.83

(58) Field of Classification Search
  None
  See application file for complete search history.

(56) References Cited

U.S. PATENT DOCUMENTS

| 5,578,209 A | * | 11/1996 | Weiss | 210/512.1 |
| 5,961,846 A | * | 10/1999 | Borchardt et al. | 210/781 |
| 2006/0020400 A1 | | 1/2006 | Okamura et al. | |
| 2007/0263477 A1 | | 11/2007 | Sudarsan et al. | |
| 2008/0318324 A1 | * | 12/2008 | Chiu et al. | 436/64 |
| 2009/0014360 A1 | * | 1/2009 | Toner et al. | 209/208 |

FOREIGN PATENT DOCUMENTS

JP   2004/330008 A   11/2004
WO   WO 2006/056219 A1   6/2006

OTHER PUBLICATIONS

Search Report from French Priority Application No. 08 02576, Filed May 13, 2008.

(Continued)

*Primary Examiner* — Krishnan S Menon
(74) *Attorney, Agent, or Firm* — Alston & Bird LLP

(57) ABSTRACT

A method of extracting a liquid phase from a suspension, the method comprising: injecting said suspension into a duct presenting a first section that is straight and a second section that is curved; and at the outlet from said curved section of the duct, extracting a liquid-enriched fraction of said suspension that is spatially separated from a particle-enriched fraction of the suspension; the method being characterized in that the injection flow rate of the suspension and the geometry of the duct are selected in such a manner that: in the straight section, lift forces cause particles to be superconcentrated in a ring around the longitudinal axis of the duct; and in the curved section, Dean secondary flows deform said ring and give rise to spatial separation between said liquid-enriched fraction and said particle-enriched fraction. A device for implementing such a method.

15 Claims, 3 Drawing Sheets

(56) References Cited

OTHER PUBLICATIONS

Dr. Shinichi Ookawara: "Particles Make the Cut in Microseparators"; Fluent News (Fall 2003), [Online]; XP002508914; URL: http://www.fluent.com/about/news/newsletters/03v12i2_fall/pdfs/jp6.pdf.

Park J et al: "Continuous Plasma Separation Form Whole Blood Using Microchannel Geometry"; May 12, 2005; Microtechnology in Medicine and Biology, 2005. 3$^{rd}$ IEEE/EMBS Special Topic Conference on Honolulu, HI USA May 12-15, 2005, Piscataway, NJ, USA, IEEE, pp. 8-9; XP010886919.

Blattert C: "Separation of blood cells and plasma in microchannel bend structures"; Oct. 1, 2004; Proceedings of the SPIE, SPIE, pp. 143-151; XP002337275.

Blattert, C. et al., *Microfluidic Blood Plasma Separation Unit Based on Microchannel Bend Structures*, IEEE EMBS (2005) pp. 38-41.

Blattert, C. et al., *Improved Plasma Yield by a New Deign of Microchannel Bend Structures*, uTAS, (2006) pp. 359-361.

Faivre, M. et al., *Geometrical Focusing of Cells in a Microfluidic Device: An Approach to Separate Blood Plasma*, Biorheology, vol. 43 (2006) pp. 147-159.

Ookawara, S, et al., *Numerical Study on Development of Particle Concentration Profiles in a Curved Microchannel*, Chem. Engineering Science 61 (2006), pp. 3714-3724.

Ookawara, S. et al., *Feasibility Study on Concentration of Slurry and Classification of Contained Particles by Microchannel*, Chem. Eng. Journal, vol. 101 (2004) pp. 171-178.

\* cited by examiner

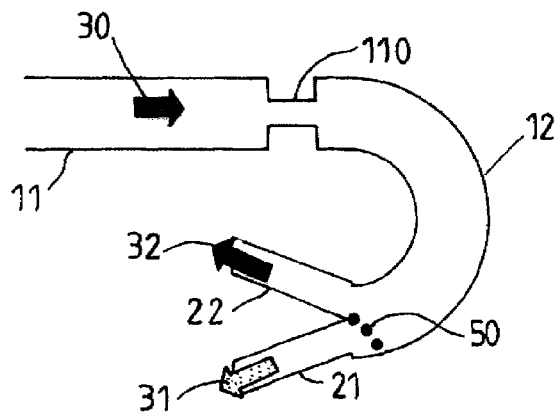
FIG.5
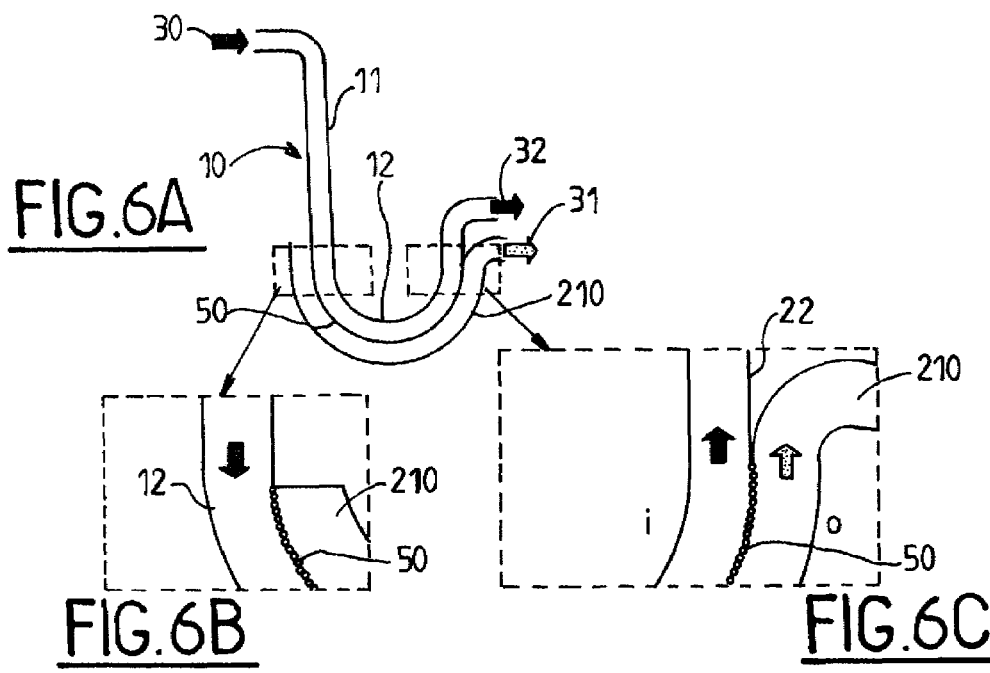
FIG.6A
FIG.6B   FIG.6C
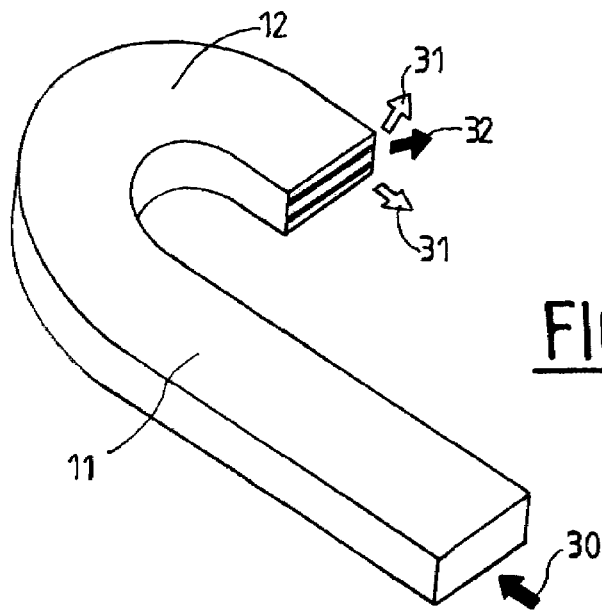
FIG.7

METHOD AND A DEVICE FOR EXTRACTING A LIQUID PHASE FROM A SUSPENSION

CROSS REFERENCE TO RELATED APPLICATION

This application claims priority from French Application No. 08 02576, filed May 13, 2008, which is hereby incorporated herein in its entirety by reference.

FIELD OF THE INVENTION

The invention relates to a method and to a device for extracting a liquid phase from a suspension. The invention applies in particular to separating blood plasma.

BACKGROUND OF THE INVENTION

Cell/plasma fractioning of blood is traditionally performed by centrifuging, in systems of macroscopic dimensions. More recently, microfluidic techniques have also been developed.

In the field of Microsystems, the technique in the most widespread use is filtering. Filters are placed perpendicularly to the flow with pores of dimensions that are optimized for retaining the particles, thereby enabling a fraction of the liquid phase to be recovered. The main limitation of that technique when applied to a biological solution lies in the great deformability of certain cells (in particular red corpuscles in blood). The pores clog quickly, particularly when the solution is highly concentrated, and the cells end up by lysing.

Another technique consists in performing separation by centrifuging at microfluidic scale, by injecting the suspension into a duct in the form of a spiral or a bend. For example, the article by C. Blattert, R. Jurischka, I. Tahhan, A. Schoth, P. Kerth, and W. Menz entitled "Microfluidic blood plasma separation unit based on microchannel bend structures", IEEE EMBS, Hawaii 12-15 May 2005, pp. 38-41, describes a device that combines the centrifuging that appears in a channel with a bend and the phenomenon of "plasma skimming" that is due to having a fine channel in the bend. Skimming corresponds to extracting the liquid phase of the blood at a junction, with extraction being the result of the large difference in flow rate between the main channel and the fine channel. That device makes it possible to extract 5% to 10% of the plasma. An improvement of the device, making it possible to achieve a yield of 15% for a hematocrit of 9%, is described in the article by C. Blattert, R. Jurischka, I. Tahhan, A. Schoth, and H. Reinecke entitled "Improved plasma yield by a new deign of microchannel bend structures" µTAS, Tokyo 5-9 Nov. 2006, pp. 359-361 and in document US 2006/020400.

The effectiveness of centrifuging techniques in Microsystems is nevertheless limited by secondary flows (Dean cells) that develop under such conditions and that tend to mix the particles that are to be separated from the liquid fraction. In this context, reference can be made to the article by S. Ookawara, D. Street, and K. Ogawa entitled "Numerical study on development of particle concentration profiles in a curved microchannel", Chem. Engineering Science 61 (2006, pp. 3714-3724, and the article by A. P. Sudarsan and V. M. Ugaz entitled "Multivortex micromixing" in PNAS (2006), 103, 19, pp. 7228-7233.

In the article by S. Ookawara, R. Higashi, D. Street, and K. Ogawa, entitled "Feasibility study on concentration of slurry and classification of contained particles by microchannel", Chem. Eng. Journal (2004), 101: pp. 171-178, proposals are made to take advantage of the equilibrium between centrifugal force and the mixing effect induced by the secondary flows in order to extract particles from a suspension.

An emerging technique lies in depleted zone extraction. This technique is based on the fact that particles in suspension injected into a straight duct are subjected to non-uniform lateral migration due to shear forces: this causes a particle-free zone to appear at the edge of the channel, followed by a superconcentrated ring, in turn surrounding a central zone in which concentration is uniform. An application of this technique to extracting blood plasma is described in the article by M. Faivre, M. Abkarian, K. Bickraj, and H. Stone entitled "Geometrical focusing of cells in a microfluidic device: an approach to separate blood plasma", Biorheology (2006), 43: pp. 147-159. For a sample diluted to a hematocrit of 16% and injected at 200 microliters per hour (µL/h), 24% of plasma is extracted.

The article by J. Park, K. Cho, C. Chung, D. C. Han, and J. K. Chang entitled "Continuous plasma separation from whole blood using microchannel geometry", IEEE EMBS, Hawaii 12-15 May (2005), pp. 8-9, describes a microfluidic device in which the depleted zone is enlarged by exploiting the high curvature zone (corner) of a bend in a microchannel. That device makes it possible to collect 99% of the cells from a volume of 20 microliters (µL) at a flow rate of 50 nanoliters per minute (nL/min).

The principal limitation of the depleted zone extraction technique is that it is based on an unstable phenomenon. Any action exerted on the flow (e.g. to extract the plasma) gives rise to a flow disturbance. In addition, the depleted zone phenomenon depends on flow conditions (liquid viscosity, rheological characteristics of particles).

SUMMARY OF THE INVENTION

An object of the invention is to provide a microfluidic technique for separating a suspension, but without at least some of the drawbacks of the prior art.

To achieve this object, the invention makes use of coupling between two effects that are themselves known: firstly, the formation of a particle concentration peak close to the wall of a straight duct as is observed when injecting a suspension into a rectilinear channel (this is the effect used in the above-mentioned technique for depleted zone extraction); and also the appearance, in a curved duct, of secondary flows known as Dean cells or vortices.

In accordance with the invention, the suspension for separating is injected into a microfluidic device having a relatively long rectilinear channel that enables a concentration peak to be established progressively close to the wall, followed by a shorter bend that causes two superposed Dean cells to be established, thereby separating the liquid and solid phases.

In the context of the invention, the Dean vortices provide an essential contribution to separation: this constitutes a conceptual break from the prior art where the effect of such vortices is considered as being unfavorable. In other words, the traditional approach is to concentrate on centrifugal force to the detriment of the viscous force driving corpuscles in Dean vortices. The invention is the result of a different or even opposite approach that consists in making the viscous force dominant to the detriment of centrifugal force. In accordance with the invention, predominance is thus given to conditions in which the particles of the suspension are mere markers of the driving flow and do not present any "independence" relative thereto.

The method of the invention has greater potential than the traditional approach based on making use of centrifugal force, particularly when the suspension for separating is blood. Blood corpuscles are very small and are of density close to that of plasma, conditions that do not enhance separation by centrifuging.

In one aspect, the invention thus provides a method of extracting a liquid phase from a suspension, the method comprising: injecting said suspension into a duct presenting a first section that is straight and a second section that is curved; and at the outlet from said curved section of the duct, extracting a liquid-enriched fraction of said suspension that is spatially separated from a particle-enriched fraction of the suspension; the method being characterized in that the injection flow rate of the suspension and the geometry of the duct are selected in such a manner that: in the straight section, lift forces cause particles to be superconcentrated in a ring around the longitudinal axis of the duct; and in the curved section, Dean secondary flows deform said ring and give rise to spatial separation between said liquid-enriched fraction and said particle-enriched fraction.

In an advantageous implementation of the invention, the length and the radius of curvature of said curved section, and the flow rate of the suspension, may be selected in such a manner that the Dean secondary flows give rise to a superconcentration of particles on the inside of the bend; under such conditions said liquid-enriched suspension fraction may be extracted from the outside of the bend. It is of interest to observe that in conventional methods based on centrifuging, the liquid-enriched suspension fraction is extracted from the inside of the bend, and not from the outside.

In an alternative embodiment of the invention, the length and the radius of curvature of said curved section, and the flow rate of the suspension, may be selected in such a manner that the Dean secondary flows give rise to a superconcentration of particles close to a midplane of the duct; under such conditions said liquid-enriched suspension fraction may be extracted from above and below said midplane.

In variants of the invention:

Said liquid-enriched suspension fraction may be extracted solely at the end of said curved section of the duct.

Filter means may be provided at the inlet of a secondary duct for extracting said liquid-enriched suspension fraction.

In a variant, a secondary duct for extracting said liquid-enriched suspension fraction may run parallel with said curved section on the outside of the curve and separated therefrom by a filter wall preventing passage of particles of the suspension.

The length and the radius of curvature of said curved section, and the flow rate of the suspension, may be selected in such a manner that the particles of the suspension are entrained by the Dean secondary flows for approximately one-fourth of a cycle only.

The length of said straight section of the duct may be selected so as to maximize said superconcentration of particles in a ring around the longitudinal axis of the duct.

The length of said straight section of the duct may lie in the range 1 millimeter (mm) to 50 mm.

The straight section of said duct may present a constriction for concentrating said superconcentration ring of particles on the longitudinal axis of the duct.

Said curved section may present a bend angle lying in the range 10° to 360°, and preferably in the range 160° to 200°, and/or a radius of curvature lying in the range 10 micrometers ($\mu$m) to 2 mm.

The Dean number of the flow of the suspension in the curved section of the duct may lie in the range 1 to 140, and preferably in the range 10 to 100.

The suspension may be blood.

In another aspect, the invention provides a microfluidic device for implementing such a method for extracting a liquid phase from a suspension, the device comprising: a main duct for conveying a flow of said suspension, the duct presenting a straight section and a curved section; and a secondary duct for extracting a liquid-enriched fraction of said suspension, the secondary duct being located at the outlet from said curved section of the main duct; the device being characterized in that the geometry of the main duct and the arrangement of the secondary duct are selected in such a manner that for an appropriate flow rate of said suspension: in the straight section, lift forces give rise to a superconcentration of particles in a ring around the longitudinal axis of the duct; in the curved section, Dean secondary flows deform said ring and give rise to spatial separation between said liquid-enriched fraction and said particle-enriched fraction; and at least a portion of said liquid-enriched fraction of the suspension for separation penetrates into said secondary duct to the exclusion of said particle-enriched fraction.

The invention also provides a microfluidic device constituted by connecting at least two individual devices as described above together in series.

BRIEF DESCRIPTION OF THE DRAWINGS

Other characteristics, details, and advantages of the invention appear on reading the following description made with reference to the accompanying drawings given by way of example, and in which:

FIGS. 4, 5, 6A to 6C, and 7 are diagrams of devices constituting alternative embodiments of the invention.

DETAILED DESCRIPTION

As explained above, the invention makes use of two phenomena in combination: lateral migration in a rectilinear channel and secondary flows in a bend; for the purpose of extracting the liquid phase from a suspension of particles, and mainly for extracting plasma from a non-diluted whole blood sample.

Figure 1:
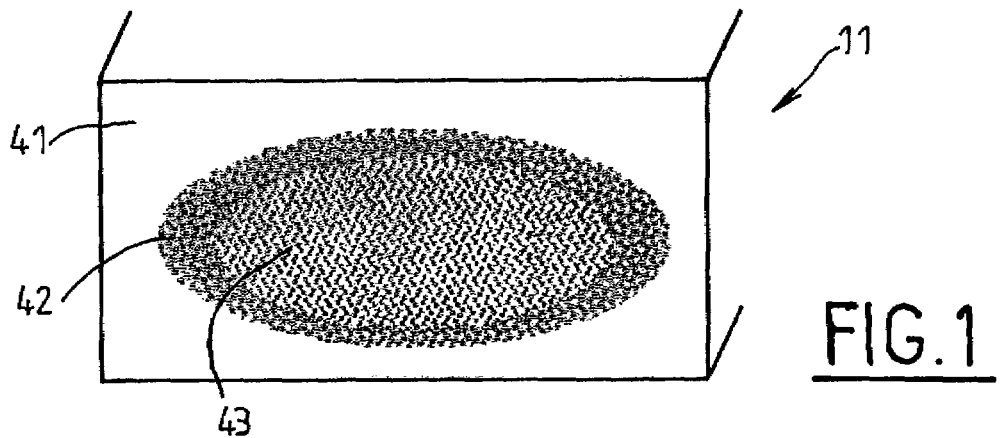
FIG. 1 shows the effect of particles in a suspension being superconcentrated in a ring around the longitudinal axis of a rectilinear duct.

In the prior art, it is known that when blood flows in a rectilinear duct, the red corpuscles, which are cells that are ellipsoidal and deformable, are subjected to a lift force that tends to move them away from the wall. FIG. 1 shows that after flowing a certain distance, the distribution profile of corpuscles in a rectilinear duct 11 of rectangular section comprises: a particle-free zone 41 close to the walls; a ring 42 centered on the longitudinal axis of the duct, where the corpuscles can be seen to be superconcentrated; and a central zone 43 where the corpuscle concentration is relatively uniform and substantially lower than in the ring 42.

The superconcentration of corpuscles in the ring 42 is initially non-existent, and it increases with flow distance, stabilizing at a limit distance of value that depends on the characteristics of the suspension (in particular its concentration in particles and the deformability of the particles), and on the characteristics of the flow. Typically, the limit distance is of the order of 1 mm to 50 mm for a duct of the microfluidic type.

Figure 2A:
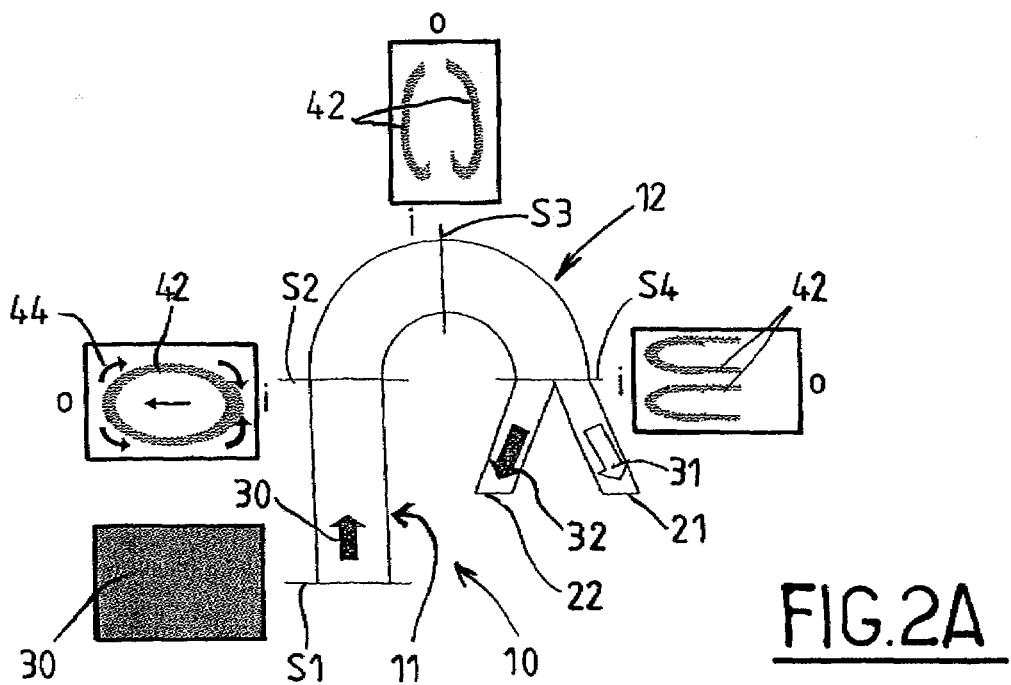
FIGS. 2A and 2B show how this effect, combined with Dean secondary flows, enables the suspension to be separated.

FIG. 2A is a diagram showing a device for implementing the method of the invention. The device essentially comprises a duct 10 having a first section 11 that is rectilinear and a second section 12 that is curved. After turning through about 180°, the curved section 12 of the duct bifurcates into two secondary ducts: a duct 21 on the outside of the bend for extracting plasma (or more precisely a blood fraction 31 that is depleted in corpuscles and enriched in plasma); and a duct 22 on the inside of the bend that collects a blood fraction 32 that is enriched in corpuscles.

At the inlet of the straight section 11 (cross-section S1), the blood 30, as injected by a syringe pusher or a pump that enables flow rate to be controlled, presents a concentration of corpuscles that is substantially uniform, whereas on entry into the curved section 12, a superconcentration ring has been able to form (cross-section S2).

Figure 2B:
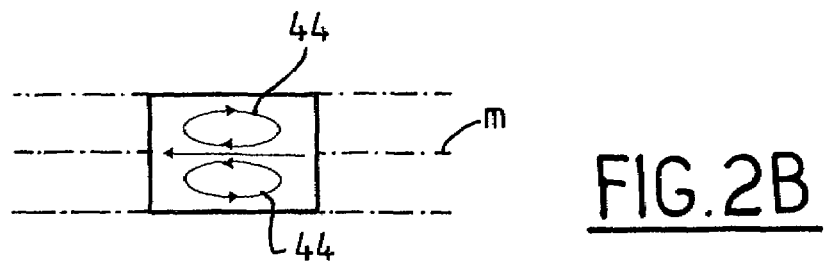

In the curved section 12 of the duct (cross-sections S2, S3, and S4), Dean secondary flows can develop. These flows are due to the combined effects of centrifugal force and of viscous forces. In a channel, the flow of a liquid is of the Poiseuille type, which means that the liquid flows faster at the center than close to the walls. Centrifugal force, which is proportional to the square of speed, is thus stronger on molecules of liquid (and on particles when the liquid is a suspension) that are situated in the center of the channel. The molecules and particles in the central region therefore tend to move towards the outside of the bend, pushing slower molecules inwards at the top and the bottom of the channel. Specifically, that gives rise to two vortices 44 appearing, known as Dean vortices, turning in opposite directions and separated by a midplane m of the channel. As shown in FIG. 2B, the secondary flows are perpendicular to the axial direction of the main flow along the duct.

The Dean flows deform the superconcentration ring 42 of particles: FIG. 2A shows how this varies between the start of the curved section (cross-section S1), through its middle (cross-section S2), to its end portion (cross-section S3). When flow conditions are selected appropriately, at the end of the curved duct 12, practically all of the corpuscles that initially made up the superconcentration ring 42 are to be grouped together on the inside i of the bend, where they can be collected by the secondary duct 22, while the blood fraction that is situated on the outside of said bend is enriched in plasma and is extracted via the secondary duct 21.

This assumes that the secondary flows are under fine control within the duct 10. If the Dean vortices are not sufficiently developed, then separation does not occur, whereas if the vortices are too developed, then they tend to re-mix the previously-separated plasma-enriched and corpuscle-enriched fractions. More precisely, it is preferable for the particles of the suspension to be entrained by the Dean secondary flows for one cycle only. In practice, this control is performed by regulating the flow rate, while the shape of the device remains unvarying.

It will be understood that if the blood flow rate is slightly higher than in the example of FIG. 2A, the additional deformation to which the superconcentration ring 42 is subjected tends to bring the corpuscles together close to the midplane m of the duct. Under such conditions, it is possible to perform a "vertical" separation of the different blood fractions, as shown in FIG. 7. Nevertheless, this embodiment is more difficult to implement since it requires a device to be fabricated that has three superposed secondary ducts, thereby presenting technological difficulties.

The parameter that characterizes the secondary flows in the curved section 12 of the duct is the (dimensionless) Dean number $\kappa$ given by:

$$K = \frac{Q}{D_h^{1/2} R^{1/2} \nu}$$

where:
Q is the injection flow rate of the suspension;
R is the mean radius of curvature of the section 12.
$\nu$ is the kinematic viscosity of the suspension; and
$D_h$ is the hydraulic diameter of the section, given in turn by $$D_h = \frac{4A}{U}$$

where A is the area of the section and U is its perimeter.

For $\kappa$ lying in the range 1 to 140, one and only one pair of Dean vortices appears; nevertheless, in order to implement the invention, it is preferable to select $10 \leq \kappa \leq 100$.

The flow rate Q generally lies in the range 1 microliter per minute ($\mu$L/min) to 10 milliliters per minute (mL/min). A value that is too low does not enable a sufficiently large Dean number to be reached, whereas the upper limit on flow rate depends on technological constraints, associated essentially with the making of connections. For microsystems made of silicon, it is found to be difficult to exceed flow rates of 800 $\mu$L/min. At higher flow rates, it appears to be necessary to have recourse to devices of larger dimensions, made by machining a plastics material.

The radius of curvature R lies typically in the range 10 $\mu$m to 2 mm. The lower limit is given by technological constraints associated with fabricating the separator device.

The hydraulic diameter $D_h$ generally lies in the range a few tens of micrometers to 1 centimeter (cm). The lower limit is determined by technological constraints of fabrication, and also by the need to convey the particles of the suspension in a flow.

The kinematic viscosity depends on the nature of the suspension for separation. For blood, its value generally lies in the range $4 \times 10^{-6}$ m$^2$/s to $25 \times 10^{-6}$ m$^2$/s, depending on the patient.

The angle of the bend $\theta$ must be greater than 10° in order to enable Dean vortices to become established. An angle of more than 360° (a spiral duct) is not desirable for implementing the invention, in order to avoid secondary flows becoming too developed and re-mixing the suspension instead of separating it. In particular, it is advantageous to select $\theta$ to lie in the range 160° to 200°, and more particularly for $\theta=180°$.

In general, the geometrical properties of the separator device are determined a priori. Then, on the basis of testing and/or simulations, the flow rate Q is determined that makes it possible to obtain optimum separation.

Figure 3:
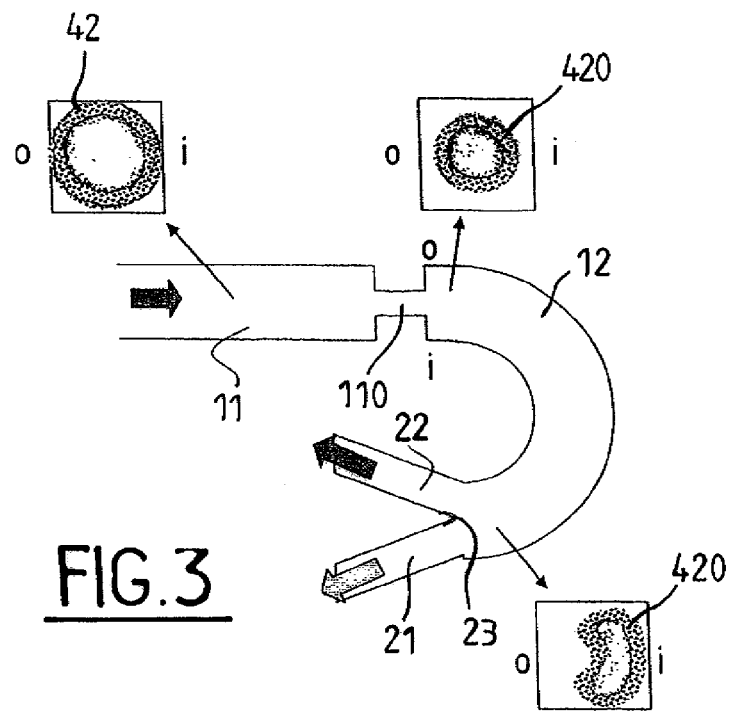
FIG. 3 is a diagram showing a device constituting an advantageous embodiment of the invention.

In FIG. 2, for reasons of simplicity, only the blood corpuscles situated in the superconcentration ring 42 are shown. In reality, as shown in FIG. 1, a non-negligible portion of the corpuscles are to be found in the central region 43 of the channel. These corpuscles are not separated by the Dean vortices, and on the contrary they tend to distribute them over the entire cross-section of the duct. Separation is therefore not complete. In order to improve separation, it is possible to make use of the fact that a geometrical constriction 110 in the straight section 11 of the duct can accentuate the concentration of corpuscles in the ring 42 (see the above-mentioned article by M. Faivre et al.). This is shown in FIG. 3, where the reference 420 designates the superconcentration ring downstream from the constriction 110.

Ideally, the constriction 110 should be as long as and as thin as possible. Nevertheless, in practice, constrictions of width less than 20 μm can lyse blood corpuscles. Under all circumstances, it is generally preferable for the width of the constriction to be less than the width of the upstream duct by a factor of not less than 2. Concerning the length of the constriction, it is preferably longer than 50 μm, since for shorter lengths the concentration effect is small.

The shape of the section of the duct 10 is generally unimportant: for example it may be square, rectangular, or circular (even though a circular section is more difficult to fabricate). Nevertheless, when the duct is rectangular in shape, it is necessary for the height/width aspect ratio (where width is defined as the dimension in the plane of the bend) should not exceed a few units. Otherwise, multiple pairs of Dean vortices appear in the curved section of the duct, and that is undesirable because the vortices are then more difficult to control and thus to use.

The secondary ducts 21 and 22 for extraction are not necessarily of the same width: the ratio of their sections is selected so as to achieve a sufficient level of plasma purity together with an acceptable extraction yield. In general, the secondary duct for extracting plasma is narrower than the duct for extracting corpuscles, by a factor lying in the range 2 to 10. Care must be taken to ensure that the duct for extracting corpuscles is not too fine, in order to avoid it clogging quickly.

Although not clearly visible in FIG. 3, the junction 23 between the secondary ducts 21 and 22 must not present a sharp edge in order to avoid lysing incident corpuscles. A rounded junction having a radius of curvature of not less than 30 μm is recommended.

Figure 4:
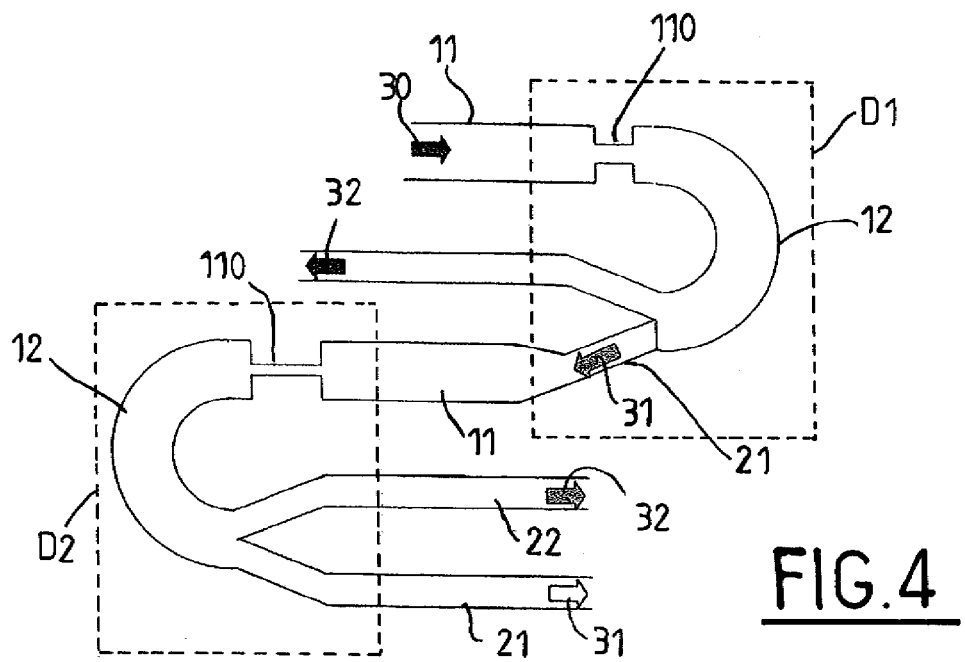

In order to improve the purity of the extracted plasma, a plurality of individual devices D1, D2 may be connected in series, as shown in FIG. 4. For example, the first individual device D1 may perform crude separation at high yield, while the second individual device D2 subsequently purifies the plasma extracted in that way.

Another option for improving the purity of the extracted plasma is to have a filter pattern 50 at the inlet to the extraction secondary duct 21, as shown in FIG. 5. The partial separation obtained by the Dean vortices prevents the filter clogging quickly as happens with known filter devices of the prior art.

The filter pattern may be constituted in particular by one or more rows of pillars, spaced at about 1.50 μm (more precisely, a distance between pillars lying in the range 1 μm to 3 μm may be appropriate).

FIGS. 6A, 6B, and 6C show another device making use of the Dean vortex separation effect in combination with a filtering effect. In this device, a secondary duct 210 for extracting plasma runs in parallel with the curved section 12 of the main duct 10, on the outside thereof, and separated therefrom by a filter wall 51 (a row of pillars). Under such circumstances, blood corpuscles entrained by the secondary flows become concentrated on the inside of the bend, while plasma can flow freely through the filter wall towards the extraction duct 210. In such a device, separation thus takes place over the entire length of the curved section 12.

A device of the invention can be made using photoetching techniques borrowed from microelectronics. Such techniques are known, thoroughly understood, and can guarantee high-precision etching. The fabrication steps may be as follows. Firstly, a substrate, e.g. a silicon substrate, is covered in a deposit of silicon oxide and then in a layer of photosensitive resin. The resin is then exposed to a mask having the desired patterns. The silicon oxide is etched through the remaining resin layer. Then the resin is removed. A new layer of thermal oxide is deposited on the entire substrate, and it is then covered by anodic sealing.

It is also possible to make the device out of a polymer. A mold is initially fabricated with patterns of photosensitive resin on a silicon or glass backing. The polymer is then deposited on the backing, cured, unmolded, and covered.

It is also possible to envisage macrofabrication by machining a backing made of plastics material (e.g. polycarbonate).

In all of the above fabrication techniques, connections are made using appropriate and biocompatible capillaries (made of polyethyletherketone, silica, silicone, polytetrafluoroethylene).

The invention claimed is:

1. A method of extracting a liquid phase from a suspension, the method comprising:
    injecting said suspension into a duct presenting a first section that is straight and a second section that is curved so as to form a single bend;
    subjecting said suspension to lift forces in the straight section of said duct that cause particles in said suspension to be superconcentrated in a ring around the longitudinal axis of the duct;
    subjecting said suspension to Dean secondary flows in the bend of said duct that deforms said ring so as to give rise to two vortices with the duct, so that at end an of said bend, a majority of the particles are condensed together on an inside of said bend, to thereby cause a spatial separation between a liquid-enriched fraction and a particle-enriched fraction; and
    extracting the liquid-enriched fraction of said suspension that is spatially separated from the particle-enriched fraction of the suspension at an outlet from said curved section of the duct, wherein said liquid-enriched fraction being extracted from an outside part of said bend;
    wherein the step of subjecting said suspension to Dean secondary flows further comprises superconcentrating the particle on an inside of a bend of the curved section, wherein said liquid-enriched suspension fraction is extracted from the outside of the bend and wherein the Dean number of the flow of the suspension in the curved section of the duct lies in the range 1 to 140.

2. A method according to claim 1, wherein said liquid-enriched suspension fraction is extracted solely at the end of said bend of the duct.

3. A method according to claim 1, wherein filter means are provided at the inlet of a secondary duct for extracting said liquid-enriched suspension fraction.

4. A method according to claim 1, wherein a secondary duct for extracting said liquid-enriched suspension fraction runs parallel with said bend on the outside of the bend and separated therefrom by a filter wall preventing passage of particles of the suspension.

5. A method according to claim 1, wherein the step of subjecting said suspension to Dean secondary flows further comprises entraining the particles of the suspension by the Dean secondary flows for approximately one-fourth of a cycle only.

6. A method according to claim 1, wherein the length of said straight section of the duct is selected so as to maximize said superconcentration of particles in a ring around the longitudinal axis of the duct.

7. A method according to claim 1, wherein the length of said straight section of the duct lies in the range 1 mm to 50 mm.

8. A method according to claim 1, wherein the straight section of said duct presents a constriction for concentrating said superconcentration ring of particles on the longitudinal axis of the duct.

9. A method according to claim 1, wherein said bend presents a bend angle lying in the range 10° to 360°.

10. A method according to claim 1, wherein said bend presents a radius of curvature lying in the range 10 µm to 2 mm.

11. A method according to claim 1, wherein the suspension is blood.

12. A method according to claim 1, wherein said curved section presents a bend angle lying in the range 160° to 200°.

13. The method according to claim 1, wherein said bend turns through about 160° to 200° to define a U-shaped bend, so that at the end of said bend, said suspension flows in a direction substantially opposite to the direction of the suspension entering the single bend.

14. A method of extracting a liquid phase from a suspension, the method comprising:
 injecting said suspension into a duct presenting a first section that is straight and a second section that is curved so as to form a single U-shaped bend;
 subjecting said suspension to lift forces in the straight section of said duct that cause particles in said suspension to be superconcentrated in a ring around the longitudinal axis of the duct;
 subjecting said suspension to Dean secondary flows in the bend of said duct that deforms said ring so as to give rise to two vortices with the duct, so that at end an of said bend, a majority of the particles are condensed together on an inside of said bend, to thereby cause a spatial separation between a liquid-enriched fraction and a particle-enriched fraction; and
 extracting the liquid-enriched fraction of said suspension that is spatially separated from the particle-enriched fraction of the suspension at an outlet from said curved section of the duct, wherein said liquid-enriched fraction being extracted from an outside part of said bend;
 wherein the step of subjecting said suspension to Dean secondary flows further comprises superconcentrating the particle on an inside of a bend of the curved section, wherein said liquid-enriched suspension fraction is extracted from the outside of the bend and wherein the Dean number of the flow of the suspension in the curved section of the duct lies in the range 1 to 140.

15. The method according to claim 1, wherein said U-shaped bend turns through an angle lying from about 160° to 200°.

* * * * *